United States Patent Office 2,781,464
Patented Feb. 12, 1957

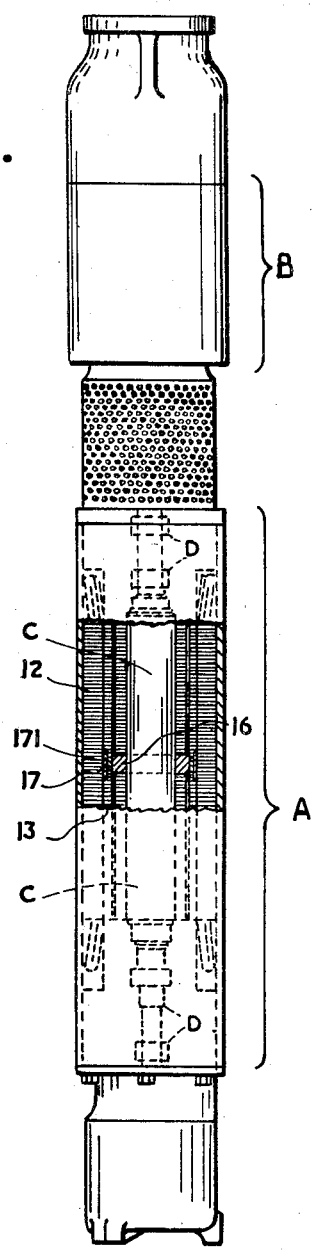

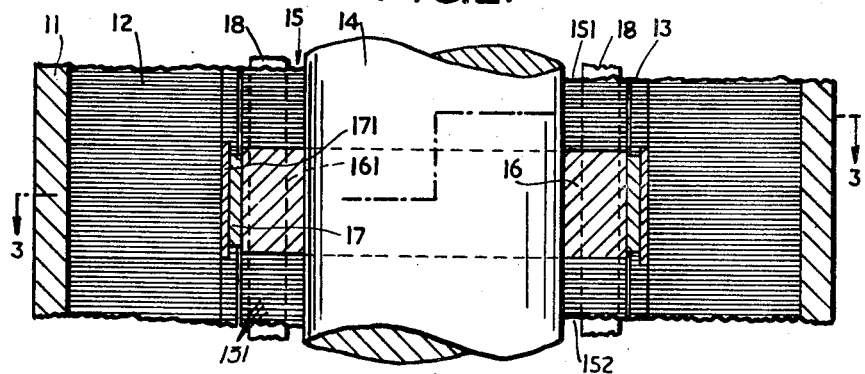
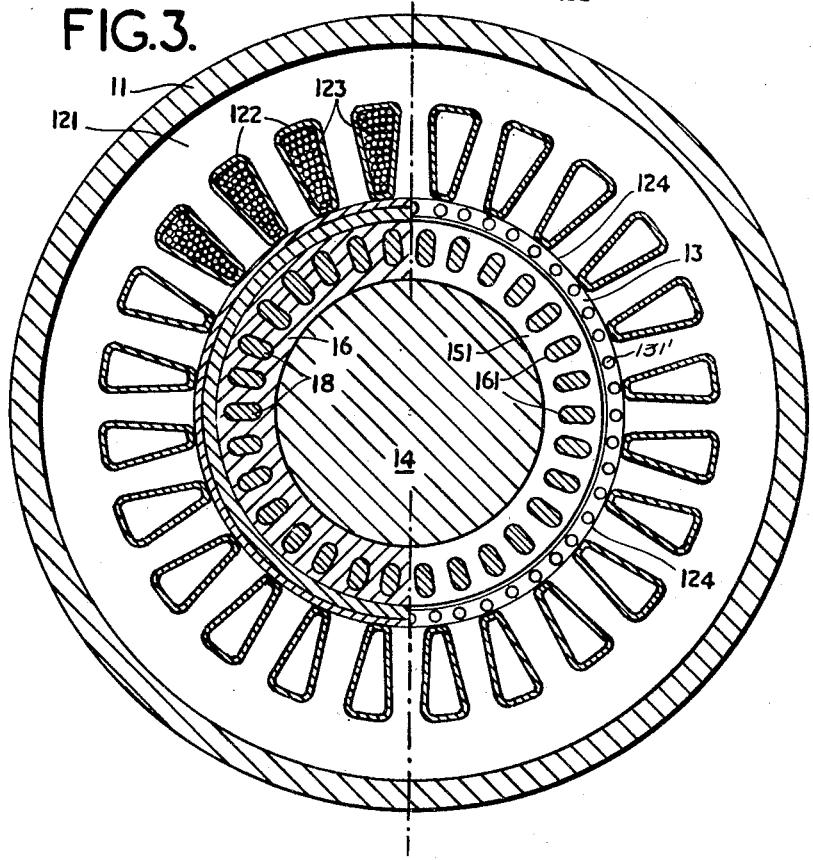

2,781,464

ELECTRIC MOTORS

Arthur William John Timms, Olton, Birmingham, England, assignor to James Beresford & Son Limited, Birmingham, England, a company with limited liability of Great Britain and Northern Ireland Application January 23, 1956, Serial No. 560,815

Claims priority, application Great Britain December 2, 1955

2 Claims. (Cl. 310—90)

This invention has reference to improvements relating to electric motors.

In connection with electric motors especially electric motors in which the rotor is of small external diameter compared to its length it is found that there is a liability when the motor is running for the rotor shaft to distort and thereby to occasion undue vibration and in extreme cases to result in contact between the rotor and the surrounding stator or stationary part associated therewith which may result in the complete failure of the motor.

The present invention has for its object to provide an improved electric motor which is not subject to the defect aforesaid even when the rotor is of relatively small external diameter compared to its length.

According to the invention the improved electric motor is characterised in that the rotor core is provided at one or more places in its length with a bearing surface which cooperates with a complementary bearing surface carried by the stator or a stationary part associated therewith.

The invention also resides in an electric motor constructed substantially as will be described hereinafter.

The invention will now be described with particular reference to the accompanying drawings wherein:

Figure 1 is a view mainly in elevation but partly broken away where desirable for the sake of clearness of a submersible electrically driven pump incorporating an electric motor of the squirrel cage induction type constructed in accordance with the invention.

Figure 2 is a fragmentary view partly in section and partly in elevation on an enlarged scale of the electric motor incorporated in the submersible electrically driven pump illustrated in Figure 1.

Figure 3 is a cross section taken on the planes indicated by the line 3—3 in Figure 2.

In the drawings like numerals of reference indicate similar parts in the several views.

The submersible electrically driven pump illustrated in Figure 1 is of the type well known in commerce under the registered trademark Beresford (registered in the United States Patent Office on January 27, 1953) and incorporates an electric motor section A and a centrifugal pump section B, the impellers (not illustrated) of the pump section B being mounted on a shaft which is co-axial with the electric motor rotor shaft C the end portions whereof are mounted in self-aligning bearing bushes D of known kind.

As will be obvious from an examination of Figure 1 the external diameter of the electric motor section A is small compared with the length and this feature is necessarily so in a submersible electrically driven pump in order to ensure that the bore hole may be of the smallest possible diameter.

According to the illustrated embodiment of the invention the improved electric motor section A comprises an outer casing 11 within which is located the stator 12. This stator 12 is formed from a plurality of laminations 121 provided therein with slots 122 for the reception of the pre-formed stator coils 123. The said laminations 121 are coated on all surfaces with a synthetic plastic material having good electrical insulating properties and assembled to form a pack; the synthetic plastic subsequently being cured with the laminations 121 subjected to endwise pressure to form a unified stator core assembly.

The preformed coils 123 constituting the stator windings are then inserted in the slots 122 in the unified stator core whereupon there is fitted into the said stator core an annular assembly of laminations 13 hereinafter termed the annular insert 13 having therein a plurality of holes or gaps 131 of such size and disposition as to make the magnetic reluctance of the laminations in the circumferential direction high in comparison with the magnetic reluctance in the transverse direction.

This annular insert 13 is constituted by laminations 131 which are coated on all surfaces with a plastic material capable of being bonded to metal, and which are then assembled into a pack with the holes or gaps 131' in register and the plastic cured with the laminations 131 under endwise pressure to bond the laminations together to form a unified assembly.

The annular insert 13 is of an external diameter such that it will fit tightly within the stator assembly and seal the said assembly in a liquid tight manner.

The number of the holes or gaps 131' in the annular insert 13 is such that at all times one hole or gap 131' in each lamina of the said insert lies opposite each space between the adjacent pole pieces 124 of the stator 12.

The rotor is constituted by a shaft 14 on which is mounted a laminated core 15 formed by coating each of a plurality of laminations on all surfaces with a synthetic plastic material capable of being bonded to metal and having good electrically insulating and mechanical properties, the laminations being assembled into a pack and the plastic material cured with the pack subjected to endwise pressure to bond the laminations to one another in a unified assembly.

The laminated rotor core is formed in two continuous and unified sections 151, 152 which are separated by a steel bearing bush 16 which is fitted tightly on the rotor shaft 14, said steel bearing bush 16 has an external diameter substantially the same as the external diameter of the rotor core 15 when formed.

The outer periphery of the steel bearing bush 16 cooperates with a complementary white metal bearing surface 17 carried by an annular backing plate 171 which is located within a slotted portion of the annular insert 13 aforesaid.

Conveniently the steel bearing bush 16 is united in unitary assembly with the rotor core 15 by bonding the said bush 16 to the adjacent ends of the rotor core sections 151, 152 using a plastic capable of being bonded to metal.

The bonding may be effected after the formation of the rotor core 15 or simultaneously with the formation of the coated laminations of the rotor core into a unified pack by bonding.

The steel bearing bush 16 is formed with holes 161 which correspond with the holes provided in the laminations for the reception of the conductor bars 18 of the rotor so that the conductor bars 18 pass through the two parts 151, 152 of the core assembly and through the steel bearing bush 16. Conveniently the conductor bars 18 are inserted within the holes in the rotor core assembly and in the intermediate steel bearing bush 16 prior to the bonding of the laminations to each other and to the said steel bearing bush 16.

Alternatively the conductor bars 18 may be threaded through the registering holes 161 in the laminations provided therefor after the bonding of the laminations to each other and to the rotor shaft 14 thereby permitting the conductor bars 18 freedom to expand and contract whilst ensuring their firm retention in the core.

It will be understood that the usual end rings not shown are fitted to the rotor core after completion of the assembly.

It has been found that a suitable synthetic plastic material for the several bonding operations is that sold in commerce under the registered trademark "Araldite."

In the case of rotors requiring an exceptionally long core more than one intermediate bearing bush 16 may be provided.

An electric motor constructed in accordance with the invention is stronger and freer from vibration than electric motors manufactured in accordance with customary practice especially in the case where the rotor core is of small external diameter compared to its length.

I claim:

1. An electric motor of the squirrel cage induction type incorporating a rotor shaft, bearings for the end portions of said shaft, a rotor core, supplementary bearing means embedded in said rotor core intermediate the ends thereof, complementary bearing means to the said supplementary bearing means embedded in said rotor core which is associated with a part surrounding the core and conductor bars which pass through the rotor core and through the supplementary intermediate bearing means aforesaid which is embodied in the rotor core.

2. An electric motor incorporating a rotor of the squirrel cage induction type incorporating a rotor shaft, bearings for the end portions of the said rotor shaft, a rotor core divided in its length, a bearing bush of hard material inserted between adjacent parts of the divided core and in unitary assembly therewith, a relatively fixed bearing surface of relatively soft bearing material complementary to said bearing bush which is carried by a part surrounding that part of the rotor including the bearing bush, and conductor bars which pass through the rotor core and bearing bush aforesaid.

References Cited in the file of this patent

UNITED STATES PATENTS

| | | |
|---|---|---|
| 2,251,816 | Arutunoff | Aug. 5, 1941 |
| 2,315,917 | Arutunoff | Apr. 6, 1943 |